Nov. 6, 1945. S. W. LANGDON 2,388,423
LIGHT SENSITIVE MATERIAL FEEDING MECHANISM
Filed Sept. 4, 1944
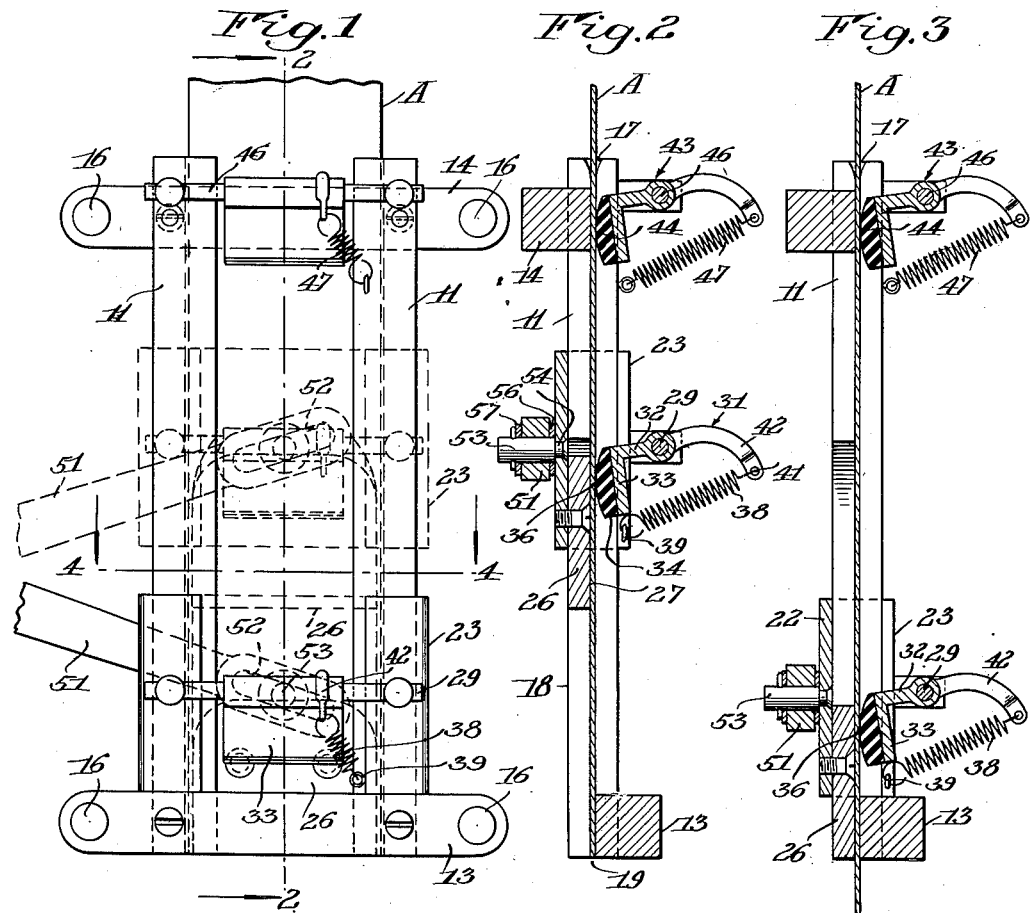
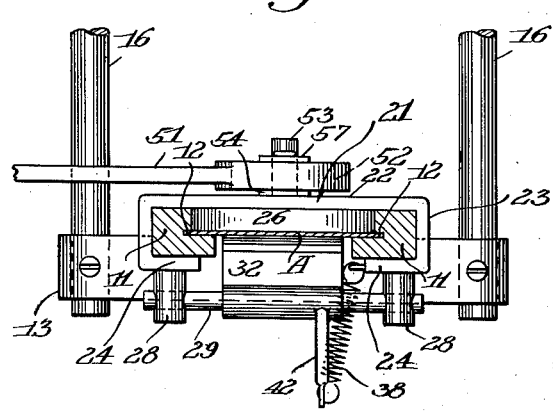
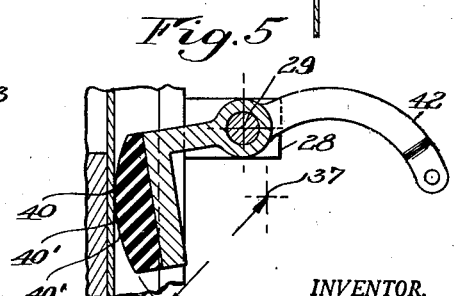
INVENTOR.
Samuel W. Langdon
BY Winslow E. Thomson
his Attorney Patented Nov. 6, 1945

2,388,423

UNITED STATES PATENT OFFICE 2,388,423

LIGHT SENSITIVE MATERIAL FEEDING MECHANISM

Samuel W. Langdon, Rochester, N. Y., assignor to Marful Specialties Incorporated, Rochester, N. Y., a corporation of New York Application September 4, 1944, Serial No. 552,711

4 Claims. (Cl. 271—2.5)

My invention relates to a sheet, light sensitive material or film feeding mechanism. While the invention may have general application, it has been particularly designed for feeding a strip of light sensitive material in a camera so that successive sections of the material may be fed to an exposure position in the camera.

Most of the film strip or paper feeding devices with which I am familiar depend for their action upon the coefficient of friction existent between the contacting surface of the feeding device and the light sensitive strip. They are not positive in action and, particularly when the non-sensitized side of the strip is highly glossed, they become ineffectual or inaccurately feed the strip when they become worn.

An object of my invention is to provide a simple sheet or film strip feeding mechanism or clutch which is positive and reliable in its action.

Another object of my invention is to provide a paper or film strip feeding device particularly adapted for the feeding of light sensitive material in which the paper strip is positively gripped and accurately fed, without slippage, so as to bring successive portions of the strip into the exposure position.

More particularly my invention contemplates the provision of a paper or film strip feeding mechanism or clutch which comprises a feeding device or finger and a holding device or finger which are adapted to exert a positive wedge action on the strip alternately when the feeding device is advanced and retracted.

Other objects and advantages of my invention will be particularly set forth in the claims and will be apparent from the following description, when taken in connection with the accompanying drawing, in which:

Fig. 1 is a rear elevation of the feeding mechanism of my invention showing the light sensitive material, the advanced and retracted position of the feeding mechanism and the actuating element for the feeding mechanism;

Fig. 2 is a sectional view taken substantially on the line 2—2 of Fig. 1, in the direction indicated by the arrows, with the paper feeding device in its retracted position;

Fig. 3 is a view similar to Fig. 2 with the paper feeding device in its advanced position;

Fig. 4 is a view taken substantially on the line 4—4 of Fig. 1 in the direction indicated by the arrows;

Fig. 5 is an enlarged sectional view which may serve as a representation of either the paper feeding device or the paper holding device.

While the sheet, film strip or light sensitive material feeding mechanism of my invention may be of general use, it has been particularly designed for use in that type of camera in which a strip is intermittently fed from a roll to the end that portions of the strip may be successively fed or presented to the exposure position of the camera and then, after exposure, advanced out of the exposure position where the strip may be wound upon a second roll or the successive pictures cut off as desired.

As shown in Figs. 1 and 4 the light sensitive paper A is threaded into and supported by a frame which comprises a pair of straight parallel bars or paper or film guides 11 which are provided with longitudinally extending slots 12 adapted for the reception and confining of the longitudinal edges of the film strip. The film guide bars are carried by and secured to a pair of cross members 13 and 14 located on opposite sides of the guide bars and which may be supported by rods 16 carried by the frame of the camera.

It will now be appreciated that the film is fed from a roll (not shown) into entrance lips 17 formed at the end of the film strip guide bars and through the slots 12, the margins of which serve to hold the film in a smooth planary condition. The film is fed to an exposure position, indicated by the numeral 18, and after exposure followed by a further advance of the film strip, may be cut off at 19 by mechanism not shown, or may be wound upon another film spool, if desired.

The film feeding mechanism includes a movable or reciprocable carriage, generally indicated by the numeral 21. The carriage comprises a plate 22 which has bent and rebent portions 23 and 24 which embrace the parallel film strip guide bars 11 so that the bars serve as a track or guideways for the carriage. The plate 22 carries a member 26 which has a smooth planary surface 27 for a purpose which will later appear.

The rebent portions 24 of the carriage plate 22 are provided with a pair of bosses 28 which extend outward on the other side of the film strip from the planary surface 27. The bosses 28 have bores adapted for the reception of a shaft 29 which extends transversely of the carriage.

The shaft 29 pivotally supports a film feed finger or clutch, generally indicated by the numeral 31. The feed finger 31 has an arm 32 which is provided with an angularly disposed part 33. The part 33 has a piece 34 of preferably rubber attached thereto in any suitable manner which has a film engaging surface 36. While the film engaging surface of the feed finger is preferably of rubber, other materials may be employed. As will presently appear the feed finger or clutch acts positively to grip the film and advance the same. While the rubber film contacting surface of the feed finger assists the feeding of the film strip, the feed finger is not dependent for its action upon the coefficient of friction existent between the film and the film engaging surface of the feed finger. The primary purpose of using rubber is to avoid abrasion or other damage to the film.

The film engaging surface 36 is rounded or preferably curved on the arc of a circle which has its center 37 located adjacent but out of coincidence with the center of the pivot 29. The center 37 of the arc upon which the film engaging surface is struck is located on the side of the pivot center 29 toward which the film is to be advanced. While the curving of the film contacting surface on the arc of a circle is desirable it is not essential. However, referring to Fig. 5, successive points 40' should be located more remote from the pivot center than the point 40.

Thus when the feed finger is pivoted in a clockwise direction about the pivot 29 the film will be wedged between the surface 27 and the film engaging surface 36. It will be apparent, due to the eccentricity of the center 37 with respect to the pivot center 29, that an increase in the force tending to rotate the feed finger in a clockwise direction increases the clutch or wedge action so as to positively grip the film strip.

The film feed finger, as viewed in the drawing, is normally urged in a clockwise direction by a spring 38, one end of which is attached, as shown at 39, to the carriage while the other end, as shown at 41, is attached to a tail piece 42 which is secured to and constitutes part of the feed finger.

A film holding finger, generally indicated by the numeral 43, is provided which prevents movement of the film in an upward direction, as viewed in the drawing, when the feed finger is retracted or moved from the position shown in Fig. 3 to that shown in Fig. 2. The holding finger, while other types of holding devices might be used, is preferably of the same construction as the film feed finger 31 and is provided with a film engaging surface 44 which is curved on the arc of a circle the center of which is eccentric with respect to the pivot point 46. The holding finger 43 is preferably provided with a spring 47 normally urging the film engaging surface 44 into engagement with the film so that the film is wedged between the holding finger and the cross member 14.

Means are provided for shifting the carriage 21 so as to advance the feed finger and thereby advance the film. Such means may comprise an actuating arm 51 the end of which is slotted as shown at 52 for the reception of a pin 53. The pin may be riveted or otherwise secured to the carriage as shown at 54. The actuating arm 51 may be spaced by a pair of washers 56 and held on the pin in the manner indicated at 57. The actuating arm 51 is shifted from the solid to the dotted line position during the actuation of the carriage and may be operated manually by an extension which protrudes outside of the camera.

In operation, after the film has been threaded in the longitudinally extending slots of the guide bars 11, the parts are in the position shown in Fig. 1. When an exposure is to be made the actuating arm 51 is operated so as to lift the arm and the carriage to the dotted line position shown in Fig. 1 or to the position of the parts shown in Fig. 2. During this movement of the carriage the feed finger or clutch slides over the film surface since movement of the carriage tends to rotate the feed finger in a counterclockwise direction, as shown in Fig. 2, against the action of the spring 38.

During the upward movement of the carriage the holding finger is operative to positively grip the film since the film is wedged between the holding finger and the bracket 14. This results from the fact that any tendency of the film to move in an upward direction, as shown in Fig. 2, tends to cause a clockwise movement of the holding finger. This action, due to the eccentricity of the film engaging surface of the holding finger with respect to the pivot point 46, results in an increase in pressure between the parts so as to positively grip the film and prevent upward movement thereof.

After exposure has been completed the arm 51 is moved manually from the dotted line position to the solid line position shown in Fig. 1 and the carriage drops from the position shown in Fig. 2 to that shown in Fig. 3. If desired the arm 51 and carriage may be restored to the solid line position of Fig. 1 by means of a spring. When the carriage drops a slight rotational movement of the film strip feed finger 31 in a clockwise direction occurs due to the engagement of the film engaging surface of the film feed finger with the film. This action increases the pressure or wedge action and results in the film being positively gripped between the surface 27 and the film engaging surface 36 of the feed finger.

Due to this positive gripping or wedge action exerted on the film, the film is carried along by the carriage without slippage. During this feeding of the film strip, movement of the film results in a slight counterclockwise movement of the holding finger against the action of the spring 47 which releases the film and allows its free movement to advance an unused portion of the film strip to the exposure position. The position of the parts is then as shown in Figs. 1 and 3 in which position the carriage blocks off the film until another exposure is to be made, at which time the actuating arm 51 is operated to repeat the operation above described.

It will be appreciated that with the arrangement of parts shown in the drawing the feed finger acts to pull the film. It would be possible to reverse the positions of the feeding and holding fingers so that the feed finger is mounted in the position occupied by the holding finger so as to push the film strip instead of pulling the same. This is possible because the film or paper strip is relatively stiff and because the film is confined in the slots of the guide bars 11. With lighter materials this arrangement would be less satisfactory than the arrangement shown in the drawing.

It would be possible also to feed the film by proper arrangement of the parts in an upward direction or in a horizontal direction or at any other angle. In addition, it will be noted that the springs 38 and 47 are not essential to the operation of the device since it would be possible to weight the tail pieces of the feeding and holding fingers so as to urge them into engagement with the film strip.

While I have shown and described the preferred form of my invention, it will be apparent that various modifications and changes may be made therein, particularly in the form and relationship of parts, without departing from the spirit of my invention as set forth in the appended claims.

I claim:

1. A feeding device for sheet material comprising, in combination, a support across which the sheet is fed, a carriage having a plane surface on one side of the sheet, a feeding device pivoted to the carriage on the other side of the sheet, said feeding device having a sheet engaging surface and said pivot being eccentric with respect to the sheet engaging surface, means for normally urging said feeding device about said pivot into engagement with the sheet, means for moving said carriage, a stationary element on one side of the sheet and a pivoted holding device on the other side of said sheet, means for normally urging said holding device into engagement with said sheet, said feeding device when the carriage is moved being shifted about said pivot to wedge the sheet between said plane surface and the sheet engaging surface, said holding device during sheet feeding movement of the carriage sliding over the surface and upon reverse movement of the carriage wedging the sheet between said stationary element and the holding device.

2. A feeding device for sheet material comprising, in combination, a carriage having a plane surface on one side of the sheet, a stationary element on the same side of the sheet as the plane surface, a feeding element pivoted to the carriage and a holding element pivoted to a stationary support, said feeding and holding elements being on the opposite side of the sheet from said plane surface and said stationary element and having sheet engaging surfaces which are eccentric with respect to their respective pivot points, means for moving the carriage to feed the sheet by a wedge action exerted between said plane surface and the sheet engaging surface of said feeding element, the sheet sliding over the holding element during the feeding operation, and said holding element wedging the sheet against the stationary element when the direction of carriage movement is reversed, said feeding element sliding over the sheet during said reverse movement of the carriage.

3. A feeding device for sheet material comprising, in combination, a carriage having a plane surface on one side of the sheet, a stationary element on the same side of the sheet as the plane surface, a feeding element pivoted to the carriage and a holding element pivoted to a stationary support, said feeding and holding elements being on the opposite side of the sheet from said plane surface and said stationary element and having sheet engaging surfaces formed on the arcs of circles which are eccentric with respect to their respective pivot points, means for normally urging the feeding and holding elements into engagement with the sheet, means for moving the carriage to feed the sheet by a wedge action exerted between said plane surface and the sheet engaging surface of said feeding element, the sheet sliding over the holding element during the feeding operation, said holding element wedging the sheet against the stationary element when the direction of carriage movement is reversed and said feeding element sliding over the sheet during the reverse movement of the carriage.

4. A feeding device for sheet material comprising, in combination, a carriage having a plane surface on one side of the sheet, a stationary element on the same side of the sheet as the plane surface, a feeding element pivoted to the carriage and a holding element pivoted to a stationary support, said feeding and holding elements being on the opposite side of the sheet from said plane surface and said stationary element and having sheet engaging members of rubber, the sheet engaging surfaces of which are smooth and formed on the arcs of circles which are eccentric with respect to their respective pivot points, means for normally urging the feeding and holding elements into engagement with the sheet, means for moving the carriage to feed the sheet by a wedge action exerted betwen said plane surface and the rubber sheet engaging surface of said feeding element, the sheet sliding over the holding element during the feeding operation, the rubber sheet engaging surface of said holding element wedging the sheet against the stationary element when the direction of carriage movement is reversed and said feeding element sliding over the sheet during the reverse movement of the carriage.

SAMUEL W. LANGDON.